US006839817B2

United States Patent
Hyde, II et al.

(10) Patent No.: US 6,839,817 B2
(45) Date of Patent: Jan. 4, 2005

(54) PRIORITY MANAGEMENT OF A DISK ARRAY

(75) Inventors: Joseph Smith Hyde, II, Tucson, AZ (US); Bruce McNutt, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 288 days.

(21) Appl. No.: 10/131,914

(22) Filed: Apr. 24, 2002

(65) Prior Publication Data

US 2003/0204687 A1 Oct. 30, 2003

(51) Int. Cl.[7] .............................................. G06F 12/00
(52) U.S. Cl. .................. 711/154; 711/151; 711/158; 710/36; 710/39; 710/40; 710/244
(58) Field of Search ............................. 711/158, 114, 711/151, 4, 154, 163, 166–167; 710/36, 39, 40, 244

(56) References Cited

U.S. PATENT DOCUMENTS

| | | | |
|---|---|---|---|
| 3,735,357 A | | 5/1973 | Maholick et al. |
| 5,649,157 A | | 7/1997 | Williams |
| 5,822,584 A | * | 10/1998 | Thompson et al. ......... 718/103 |
| 5,961,652 A | * | 10/1999 | Thompson ...................... 714/6 |
| 6,253,262 B1 | | 6/2001 | Rozario et al. |
| 6,549,991 B1 | * | 4/2003 | Huang et al. ................ 711/158 |
| 6,571,326 B2 | * | 5/2003 | Spiegel et al. .............. 711/170 |
| 6,647,514 B1 | * | 11/2003 | Umberger et al. ............ 714/42 |
| 2001/0015727 A1 | * | 8/2001 | Gunji et al. ................. 345/531 |
| 2002/0042864 A1 | * | 4/2002 | Iizuka ........................ 711/154 |

FOREIGN PATENT DOCUMENTS

| | | | | |
|---|---|---|---|---|
| EP | 0488501 A2 | * | 3/1992 | ............. G06F/9/46 |
| JP | 2000172570 | | 6/2000 | |

* cited by examiner

*Primary Examiner*—Mano Padmanabhan
*Assistant Examiner*—Jasmine Song
(74) *Attorney, Agent, or Firm*—Anthony V. S. England; Randall J. Bluestone

(57) ABSTRACT

In a first form, a method for managing requests in a disk array having a number of disks includes associating priorities with respective requests. A new request is processed, which includes determining a maximum priority for at least certain ones of requests received and comparing the priority of the new request to the maximum priority. Responsive to the comparison, a selection is made between i) categorizing the new request as a foreground disk operation and ii) categorizing the new request as a background disk operation. A selection is also made between i) working the new request on at least one of the disks and ii) placing the new request in a queue.

40 Claims, 4 Drawing Sheets

PRIORITY MANAGEMENT OF A DISK ARRAY

BACKGROUND

1. Field of the Invention

The present invention concerns management of disk operations, and, more particularly, concerns management of disk operations according to priorities.

2. Related Art

State of the art disk storage systems automatically reorder input/output operations to more nearly optimize disk utilization. To influence or even entirely override this automatic reordering, operations of special importance can be specified via existing disk protocols, such as protocols for tag command queuing. For example, a "head of queue" tag can be used to force a disk array to process an operation ahead of all others. An "order queue" tag can be used to force the disk array to process a particular operation immediately after finishing prior operations. However, this command queuing capability has limitations that tend to restrict its application. Its use tends to be counterproductive when used under ordinary production conditions instead of handling emergencies, such as failover. That is, externally imposed prioritization tends to disrupt automatic optimization. Therefore a more generalized ability is needed to organize disk operations based on priority for ordinary production conditions.

SUMMARY

The forgoing need is addressed, in a first form, by a method for managing requests in a disk array having a number of disks. A new request is processed, which includes determining a maximum priority for at least certain ones of requests received and comparing the priority of the new request to the maximum priority. Responsive to the comparison, a selection is made between i) categorizing the new request as a foreground disk operation and ii) categorizing the new request as a background disk operation. A selection is also made between i) working the new request on at least one of the disks and ii) placing the new request in a queue.

In another form, a storage controller includes means for associating priorities with respective requests. The requests include requests for a disk array having a number of disks. The storage controller includes means for sending the requests for working by the disks, means for determining a maximum priority for certain requests received, and means for comparing the priority of a new request to the priority for the certain requests. The storage controller also includes means for selecting between i) categorizing the new request as a foreground disk operation and ii) categorizing the new request as a background disk operation, responsive to the comparison, as well as means for selecting between i) working the new request on at least one of the disks and ii) placing the new request in a queue external to the disks, responsive to the comparison.

Objects, advantages and other forms of the invention will become apparent upon reading the following detailed description and upon reference to the accompanying drawings.

DETAILED DESCRIPTION OF PREFERRED EMBODIMENT

The claims at the end of this application set out novel features which applicants believe are characteristic of the invention. The invention, a preferred mode of use, objectives and advantages, will best be understood by reference to the following detailed description of an illustrative embodiment read in conjunction with the accompanying drawings.

Figure 1:
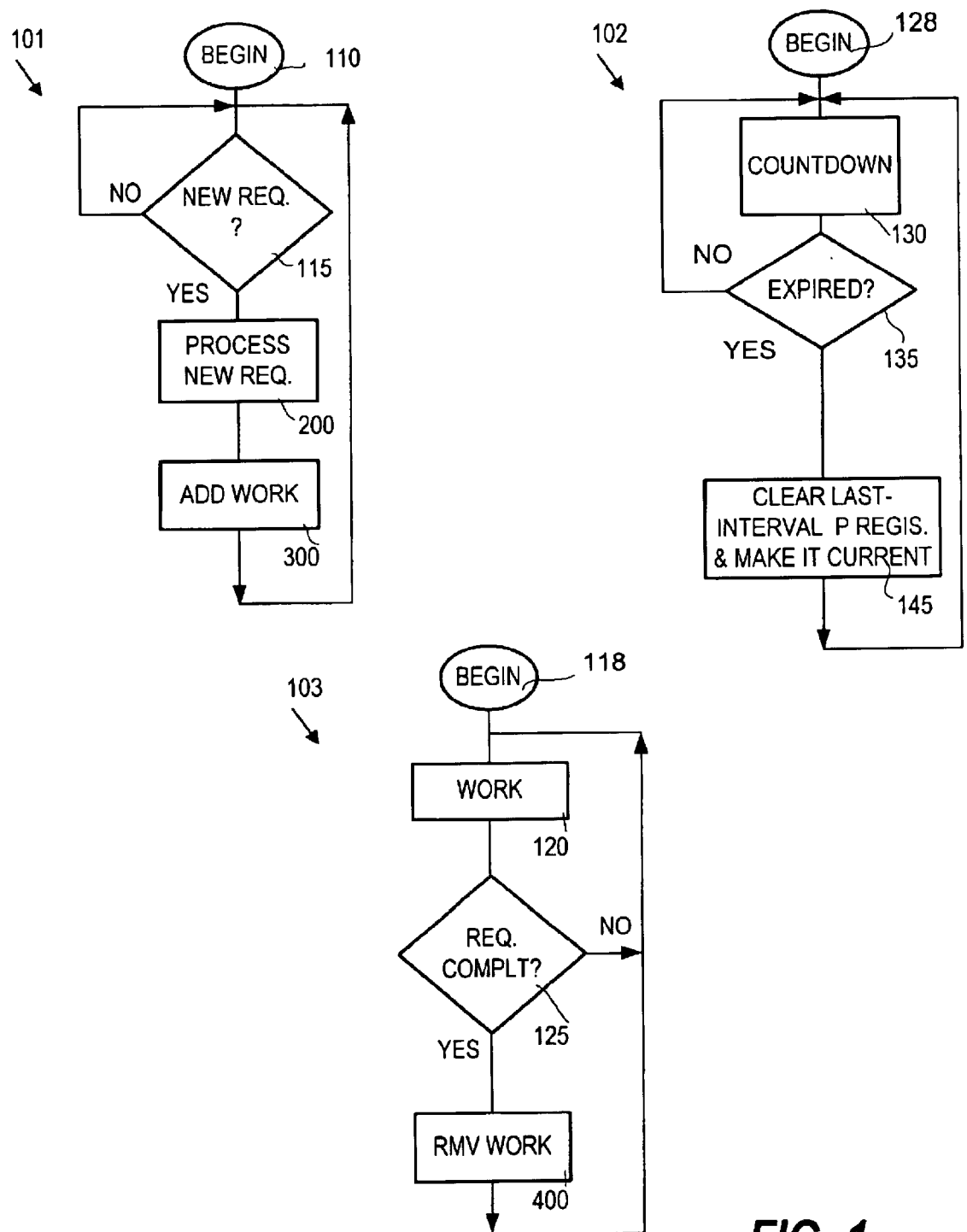
FIG. 1 illustrates algorithms for handling new requests in a disk array, determining a maximum priority of certain of the requests and working and completing requests, according to an embodiment of the present invention.

Referring now to FIG. 1, concurrent algorithms 101, 102 and 103 are shown, according to an embodiment of the present invention. Algorithm 101, beginning at 110, includes blocks for handling new requests in a disk array. In this algorithm, new requests are awaited at 115. When a new request is received, it is processed at 200 (an embodiment of which is shown in more detail in FIG. 2), which includes categorizing the new request and ultimately releasing it to the disks. Then, at 300 (an embodiment of which is shown in more detail in FIG. 3) the work is added, which includes updating measures of disk work. Then the algorithm 101 returns to 115, where it awaits additional new requests.

Meanwhile, in algorithm 103, which begins at 118, the requests that have been released to the disks are worked at 120, and the a check is made for completing requests at 125. When a request being worked is completing, the work is removed at 400 (an embodiment of which is shown in more detail in FIG. 4), which includes updating the measures of disk work.

Two registers (not shown in FIG. 1), referred to herein as "P registers," maintain respective priority bit maps, one for the requests received during the current interval, and one for requests received in the immediately preceding interval. That is, each of the P registers have bits for each possible priority value. When a request is received, a bit corresponding to the priority of the request is flipped in the current priority register, if it has not already been flipped due to a request already received during that interval. In this manner, the highest priority request received during the current interval is determined by the highest order bit flipped in the current P register, and likewise the highest priority request received during the previous interval is determined by the highest order bit flipped in the second P register. This is done because it is assumed that recent requests are the best indication of priorities of upcoming requests.

In algorithm 102, which begins at 128, the P registers are periodically maintained. Specifically, at 130 a timer counts down for a predetermined time interval, e.g., 0.1 seconds according to the embodiment. At 135 there is a check for expiration of the interval. Then, at 145 the register for the last interval is cleared and designated to be the new current-interval register, i.e., for the upcoming interval. Then counting down begins again for a new time interval at 130.

Figure 2:
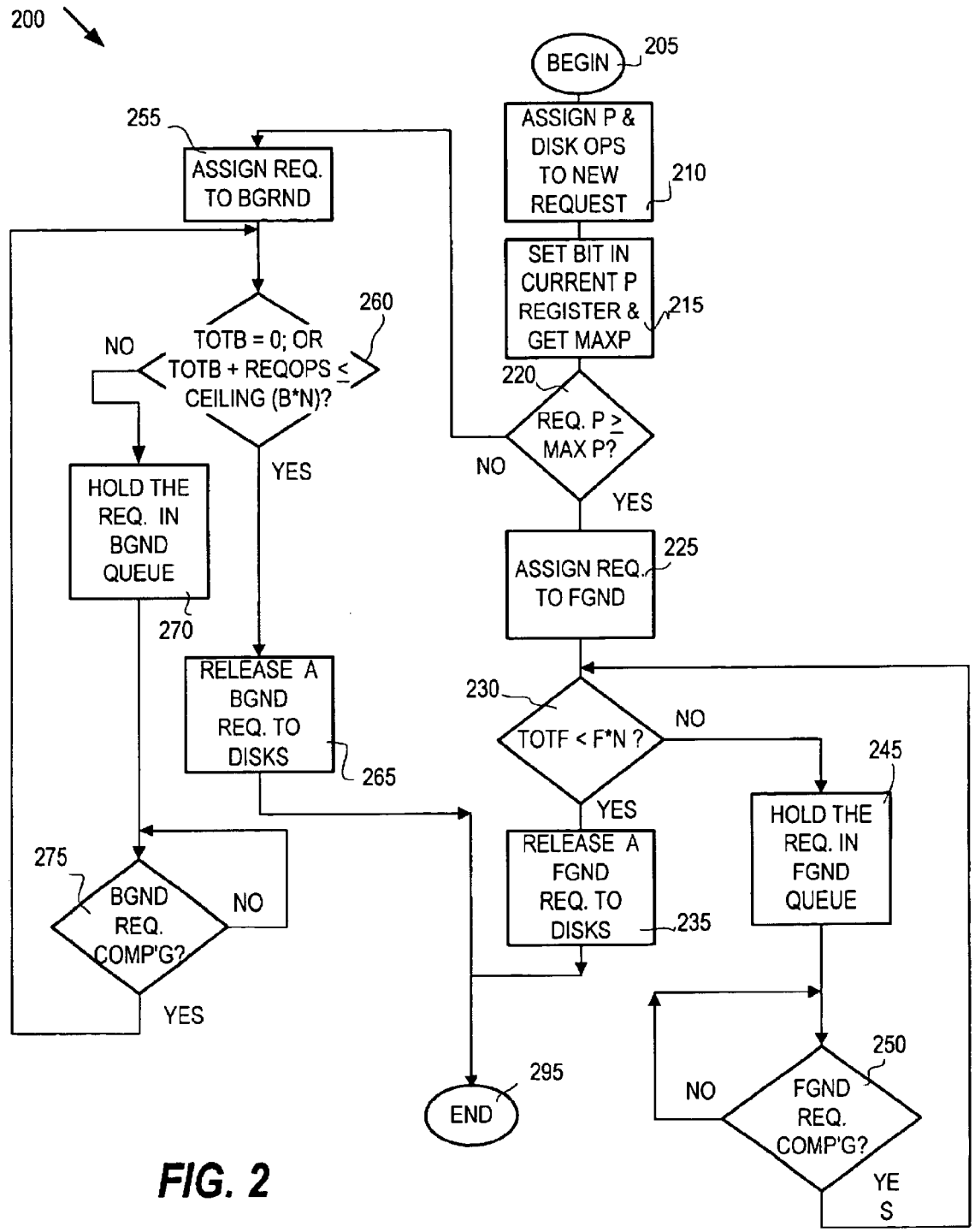
FIG. 2 illustrates an algorithm for processing a new request, according to an embodiment.

Referring now to FIG. 2, details of algorithm 200 are shown for processing a new request beginning at 205, according to an embodiment. At 210 a priority "P" and a disk operation value "ReqOps" are assigned to the new request. (Requests currently being worked are also referred to herein as "disk operations.") The disk operation value is a measure of disk work required for the request. According to the embodiment, the priority is a value between 0 and 15, inclusive. The disk operation value is a function of the type of request. For a RAID 5 random read operation, the disk operation value is 1. For a RAID 5 random write operation, the disk operation value is 4. For a stride write operation, the disk operation value is N, where N is the number of disks in the array.

Next, at 215, the bit corresponding to the priority of the new request is set in the current-interval priority register and the two P registers are examined to determine MaxP, i.e., the priority corresponding to the maximum priority bit set among all the bits in the two P registers. Next, at 220, the priority value of the new request is compared to that of MaxP for recently received disk work. If the new request has a priority at least as high as MaxP, the request is assigned to foreground work at 225. If the new request has a lower priority, it is assigned to background work at 255.

For a request assigned to foreground, the next block is 230, where the total current foreground work, prior to the addition of the new request, is compared to F, the maximum permissible number of foreground operations per disk in the array, times N, the total number of disks in the array. If the current total foreground work is greater than the permissible limit, at 245 the request is put into a queue for foreground requests. The foreground request queue operates on a first-in-first-out basis. Next, at 250 the algorithm 200 awaits completion of a disk operation. When a disk operation completes, the current total foreground work "TotF" is reduced by the amount of the disk operation value for the completing disk operation, as will be further describe connection with FIG. 4 herein below. Then, once again at 230, the current total foreground work is compared to the permissible limit. If the limit is still exceeded, the foreground requests continue to hold in their queue. If not exceeded, then at 235 the oldest request in the foreground queue is released to the disk array to be worked, and the algorithm 200 ends at 295.

For a request assigned to background, the next block is 260, where B, the maximum permissible number of background operations per disk in the array, times N, the total number of disks in the array, is rounded up to the nearest integer, i.e., "ceiling(B*N)." This value is compared to the total current background work "TotB," including the addition of the new request. (It is assumed, in the embodiment, that the limit to background work will be smaller than that for foreground work. Therefore, the new request is included in the total in the case of background work, but not for foreground work, because it is assumed that the addition of the new request will have a much greater effect on the total if it is added to background work than if it is added to foreground work.) If the current total background work is greater than the permissible limit, at 270 the request is put into a queue for background requests. The background request queue operates on a first-in first-out basis, according to the embodiment. Next, at 275 the algorithm 200 awaits completion of a disk operation. As previously stated, when a disk operation completes, the current total background work is reduced by the amount of the disk operation value for the completing disk operation, as will be further describe connection with FIG. 4 herein below. Then, once again at 260, the current total background work is compared to the permissible limit. If the limit is still exceeded, the background requests continue to hold in their queue. If not exceeded, then at 265 the oldest request in the background queue is released to the disk array to be worked, and the algorithm 200 ends at 295.

Figure 3:
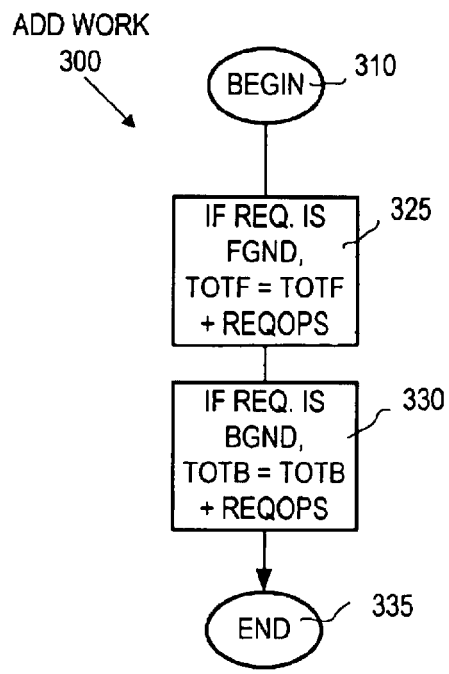
FIG. 3 illustrates an algorithm for adding work to the disk array, according to an embodiment.

Referring now to FIG. 3, details are shown of the algorithm 300 for adding work to the disk array. The algorithm begins at 310, then at 325, if the request been added is a foreground request, the total foreground work measure "TotF" is increased by the amount of the disk operation value for the added request. Then, at 330, if the request being added is a background request, the total background work measure "TotB" is increased by the amount of the disk operation value for the added request. Then the algorithm 300 ends at 335.

Figure 4:
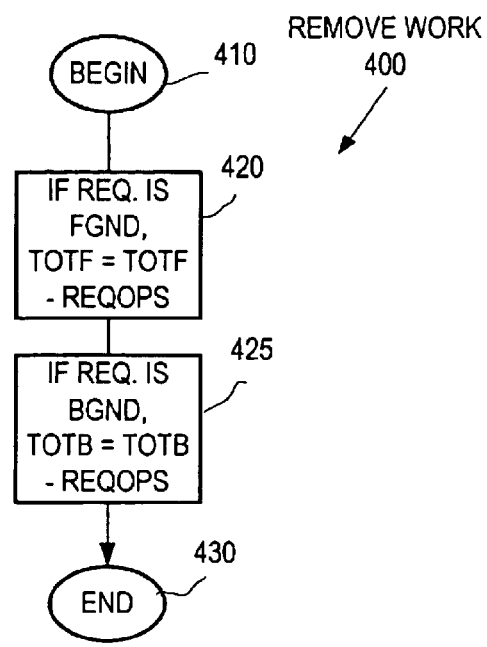
FIG. 4 illustrates an algorithm for removing work from the disk array, according to an embodiment.

Referring now to FIG. 4, details are shown of the algorithm 400 for removing work from the disk array, that is, for work which is completing. The algorithm 400 begins at 410, then at 420, if request been removed is a foreground request, the total foreground work measure "TotF" is decreased by the amount of the disk operation value for the removed request. Then, at 425, if the request been removed is a background request, the total background work measure "TotB" is decreased by the amount of the disk operation value for the removed request. Then the algorithm 400 ends at 430.

Figure 5:
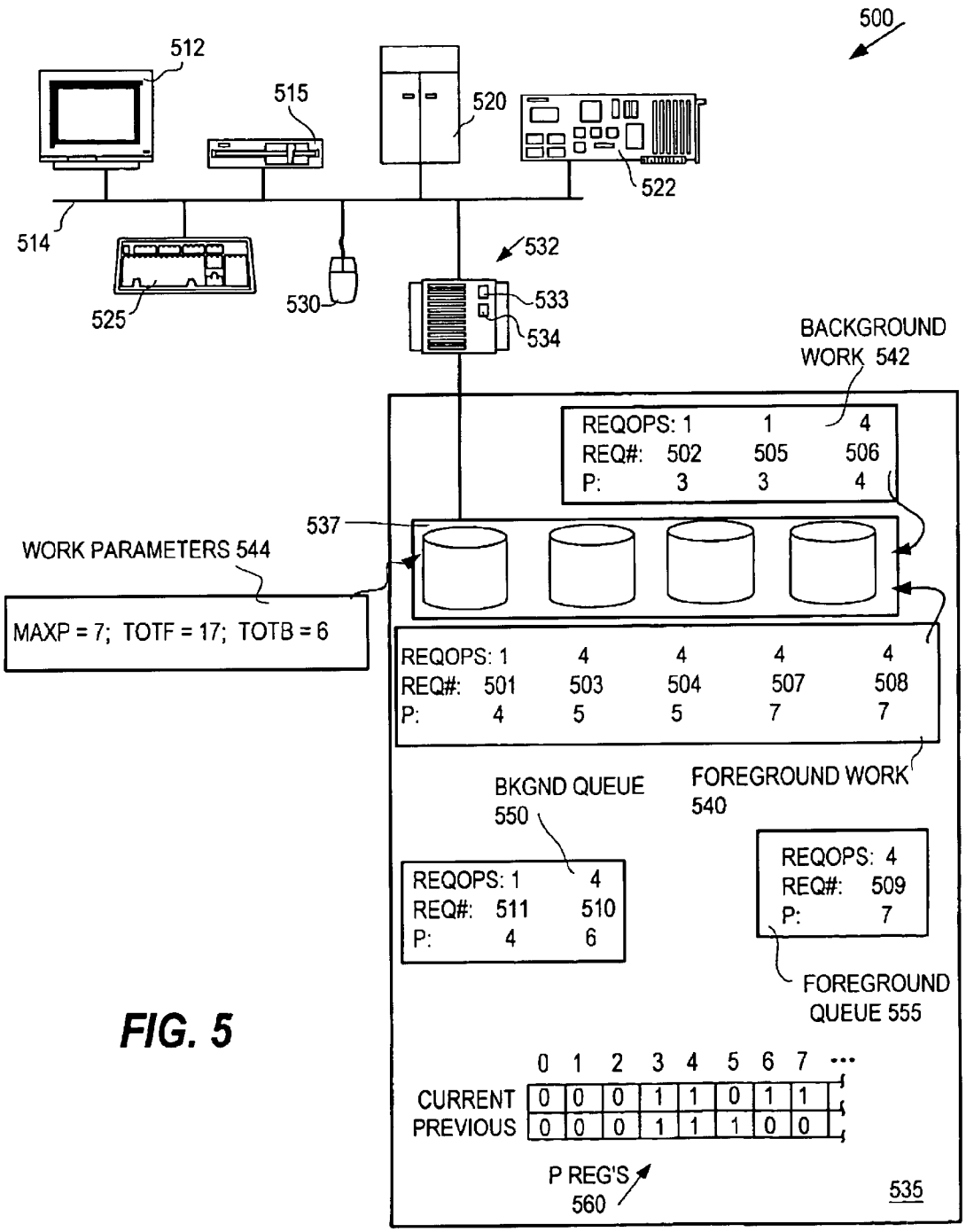
FIG. 5 illustrates a computer system, according to an embodiment of the present invention.

Referring now to FIG. 5, a computer system 500 is shown according to an embodiment of the present invention. The apparatus 500 includes a monitor 512, keyboard 525, floppy disk drive 515, mouse 530, processor 520, memory 522 and storage controller 532 coupled to a bus 514, and a disk array 535 coupled to the storage controller 532. The storage controller 532 includes a memory 534 for instructions operable with a processor 533 for managing requests in the disk array 535 to perform the operations described herein above. Likewise the system 500 memory 522 is for instructions operable with the system processor 520. In various embodiments some of the operations are performed under control of the system processor 520 and some are performed under control of the storage controller 532 processor 533. One of the embodiments includes an arrangement in which there is no separate system controller 532, and the system processor 520 performs the operations to manage the disk array 535.

In the embodiment of FIG. 5, the disk array 535 has four storage disks 537 which at the instant illustrated are performing a certain amount of foreground work 540 and background work 542. Specifically, the background work 540 includes requests 502, 505 and 506. Request 502 has a disk operation value of 1 and a priority of 3. Request 505 has a disk operation value of 1 and a priority of 3. Request 506 has a disk operation value of 4 and a priority of 4. Thus, the total background work TotB at the instant illustrated=1+1+4=6. Similarly, the foreground work 542 includes requests 501, 503, 504, 507 and 508. The requests have disk operation values and priorities as shown, so that the total foreground work TotF at the instant illustrated=1+4+4+4+4=14. In this particular case, all the requests were received within the last 0.2 second, so the work parameters 544 for the disk array 535 at the instant illustrated include TotF=14 and TotB=6.

The disk array 535 also has a background queue 550 and a foreground queue 555 external to the disks 537, which at the instant illustrated contain requests waiting to be released to the disks 537 as shown. (These queues 550 and 555 are independent of conventional queues (not shown) that the disk array uses to reorder operations for minimizing seek and latency.) In the example, requests 505–511 were received in the last 0.1 second and 501–504 were received in the prior 0.1 second, so the P registers 560 are set as shown and MaxP=7 at the instant shown.

In the embodiment, the allowable limit of foreground work=4 per disk*4 disks=16, and the allowable limit of background work=1 per disk*4 disks=4. Thus, since the priority for request 509 equaled MaxP for current disk work at the time it was received, request 509 was assigned to foreground work. Requests 501, 503, 504, 507 and 508 were working when requests 509, 510 and 511 were received. Since the combined total foreground work TotF was 17 at the time when request 509 was received, and this total exceeds the allowable foreground limit of 16, request 509 is held in the foreground queue 555 instead of being released to the disks 537.

In the embodiment, at the time when request 506 was received, requests 502 and 505 were working in background and requests 501, 503 and 504 were working in the foreground. Request 506 was consequently categorized as background work, since its disk operation value of 4 was less than MaxP at the time, which was 5. The combined total background work TotB for requests 502 and 505 was 2, which was less than the maximum permissible background work of 4, so request 506 was released to the disks 537.

At the time when request 510 was received, requests 502, 505 and 506 were working in background and requests 501, 503, 504, 507 and 508 were working in the foreground. Request 510 was consequently categorized as background work since its disk operation value of 4 was less than MaxP at the time, which was 7. The combined total background work TotB for requests 502, 505 and 506 was 6, which was more than the maximum permissible background work of 4, so request 506 was placed in the background queue 550. Likewise, request 511 was placed in the background queue 550 for similar reasons.

It should be appreciated that the invention is advantageous because disk utilization can still be optimized by the conventional disk operation reordering mechanisms to the extent that requests are not queued in the foreground or background queue of the present invention. Since a larger limit may be set for foreground work according to an embodiment of the invention, foreground operations tend not to be queued as often as background operations. Thus, particularly for foreground operations the invention reduces the impact of prioritizing requests on conventional automatic disk utilization optimization. Furthermore, invention also mitigates the effect on conventional optimization since the foreground and background queues of the present invention are independent of conventional queues for automatic I/O reordering.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, while certain aspects of the present invention have been described in the context of a fully functioning data processing system, those of ordinary skill in the art will appreciate that processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

As another example, in the above described embodiment only the priorities of requests received in the two most recent 0.1 second intervals are considered for determining whether new requests are categorized as foreground or background. In an alternative embodiment, the priorities are considered for each disk operation currently working.

As another example, in the above described embodiment a new request is included in the work total in the case of background work, but not for foreground work, because it is assumed that the addition of the new request will have a much greater effect on the total if it is added to background work than if it is added to foreground work. In an alternative embodiment, foreground and background work are both handled in the same manner.

As another example, in the above described embodiment requests that are queued are released on a first-in-first-out basis. In an alternative embodiment, a request is released responsive to the disk on which it will access in a manner that tends to spread work among the disks.

As another example, in the above described embodiment requests are placed in a foreground queue if categorized as foreground and a background request if categorized as background. In an alternative embodiment, requests are categorized but those which are queued are placed in a single queue.

As another example, in the above described embodiment the categorizing for a request occurs only once regardless of subsequent updates to the maximum priority. In an alternative embodiment, a request that is placed in a queue is re-categorized as a foreground or background request prior to or upon releasing the request for working on the disks.

To reiterate, many additional aspects, modifications and variations are also contemplated and are intended to be encompassed within the scope of the following claims. Moreover, it should be understood that the following claims do not necessarily have to be performed in the particular sequence in which they are set out.

What is claimed is:

1. A method for managing requests in a disk array having a number of disks, the method comprising:

associating priorities with respective disk access requests;

working the disk access requests by the disks;

determining a maximum priority for certain disk access requests received;

comparing the priority of a new disk access request to the priority for the certain disk access requests;

selecting between i) categorizing the new disk access request as a foreground disk access and ii) categorizing the new disk access request as a background disk access, responsive to the comparison; and selecting between i) working the new disk access request on at least one of the disks and ii) placing the new disk access request in a queue, responsive to the comparison, wherein such categorization of a new disk access request categorizes the new disk access request exclusively as a foreground disk access or exclusively as a background disk access so that such a disk access request is not categorized as both a foreground disk access and a background disk access.

2. The method of claim 1, wherein the requests working on the disks include foreground and background requests, the method comprising associating measures of disk work with respective requests, wherein the selecting between i) working the new request on at least one of the disks and ii) placing the new request in a queue is responsive to whether current foreground disk work exceeds a first predetermined limit, if the request is categorized as a foreground request.

3. The method of claim 1, wherein the requests working on the disks include foreground and background requests, the method comprising associating measures of disk work with respective requests, wherein the selecting between i) working the new request on at least one of the disks and ii) placing the new request in a queue is responsive to whether current background disk work plus disk work for the new request exceeds a predetermined limit, if the request is categorized as a background request.

4. The method of claim 3, wherein the selecting between i) working the new request on at least one of the disks and ii) placing the new request in a queue is responsive to whether there is current background disk work, if the request is categorized as a background request.

5. The method of claim 1, wherein the selecting between i) working the new request on at least one of the disks and ii) placing the new request in a queue is responsive to current disk work, and a request is released from its queue and worked by the disk responsive to the disk work falling below a predetermined limit.

6. The method of claim 1, wherein foreground requests placed in a queue are placed in a first queue, and background requests placed in a queue are placed in a second queue.

7. The method of claim 1, wherein the certain requests received, for which the maximum priority is determined, include requests received during a certain time interval.

8. The method of claim 1, wherein the categorizing for a request occurs only once regardless of subsequent updates to the maximum priority for requests working on the disks.

9. A computer program product for use in managing requests in a disk array having a number of disks, the computer program product comprising computer readable storage media including program logic embedded therein that causes control circuitry to perform:

associating priorities with respective disk access requests;

working the disk access requests by the disks;

determining a maximum priority for certain disk access requests received;

comparing the priority of a new disk access request to the priority for the certain disk access requests;

selecting between i) categorizing the new disk access request as a foreground disk access, and ii) categorizing the new request as a background disk access, responsive to the comparison; and selecting between i) working the new disk access request on at least one of the disks and ii) placing the new disk access request in a queue, responsive to the comparison, wherein such categorization of a new disk access request categorizes the new disk access request exclusively as a foreground disk access or exclusively as a background disk access so that such a disk access request is not categorized as both a foreground disk access and a background disk access.

10. The computer program product of claim 9, wherein the requests working on the disks include foreground and background requests and wherein the program logic causes control circuitry to perform:

associating measures of disk work with respective requests, and wherein the selecting between i) working the new request on at least one of the disks and ii) placing the new request in a queue is responsive to whether the current foreground disk work exceeds a first predetermined limit, if the request is categorized as a foreground request.

11. The computer program product of claim 9, wherein the requests working on the disks include foreground and background requests and wherein the program logic causes control circuitry to perform:

associating measures of disk work with respective requests, wherein the selecting between i) working the new request on at least one of the disks and ii) placing the new request in a queue is responsive to whether the current background disk work plus the disk work for the new request exceeds a predetermined limit, if the request is categorized as a background request.

12. The computer program product of claim 11, wherein the selecting between i) working the new request on at least one of the disks and ii) placing the new request in a queue is responsive to whether there is current background disk work, if the request is categorized as a background request.

13. The computer program product of claim 9, wherein the selecting between i) working the new request on at least one of the disks and ii) placing the new request in a queue is responsive to current disk work, and a request is released from its queue for working by the disk responsive to the disk work falling below a predetermined limit.

14. The computer program product of claim 9, wherein foreground requests placed in a queue are placed in a first queue and background requests placed in a queue are placed in a second queue.

15. The computer program product of claim 9, wherein the certain requests received, for which the maximum priority is determined, include requests received during a certain time interval.

16. The computer program product of claim 9, wherein the categorizing for a request occurs only once regardless of subsequent updates to the maximum priority for requests working on the disks.

17. An apparatus comprising:

a processor;

a disk array having a number of disks and at least one queue, the at least one queue being external to the disks; and a memory having instructions operable with the processor for managing requests in the disk array to perform:

associating priorities with respective disk access requests;

working the disk access requests by the disks;

determining a maximum priority for certain disk access requests received;

comparing the priority of a new disk access request to the priority for the certain disk access requests;

selecting between i) categorizing the new disk access request as a foreground disk access and ii) categorizing the new disk access request as a background disk access, responsive to the comparison; and selecting between i) working the new disk access request on at least one of the disks and ii) placing the new disk access request categorizes the new disk access request exclusively as a foreground disk access or exclusively as a background disk access so that such a disk access request is not categorized as both a foreground disk access and a background disk access.

18. The apparatus of claim 17, wherein the requests working on the disks include foreground and background requests, and the processor is operable with the instructions to associate measures of disk work with respective requests, and wherein the selecting between i) working the new request on at least one of the disks and ii) placing the new request in a queue is responsive to whether the current foreground disk work exceeds a first predetermined limit, if the request is categorized as a foreground request.

19. The apparatus of claim 17, wherein the requests working on the disks include foreground and background requests, and the processor is operable with the instructions to associate measures of disk work with respective requests, and wherein the selecting between i) working the new request on at least one of the disks and ii) placing the new request in a queue is responsive to whether the current background disk work plus the disk work for the new request exceeds a predetermined limit, if the request is categorized as a background request.

20. The apparatus of claim 19, wherein the selecting between i) working the new request on at least one of the disks and ii) placing the new request in a queue is responsive to whether there is current background disk work, if the request is categorized as a background request.

21. The apparatus of claim 17, wherein the selecting between i) working the new request on at least one of the disks and ii) placing the new request in a queue is responsive to current disk work, and a request is released from its queue and worked by the disk responsive to the disk work falling below a predetermined limit.

22. The apparatus of claim 17, wherein foreground requests placed in a queue are placed in a first queue and background requests placed in a queue are placed in a second queue.

23. The apparatus of claim 17, wherein the certain requests received, for which the maximum priority is determined, include requests received during a certain time interval.

24. The apparatus of claim 17, wherein the categorizing for a request occurs only once regardless of subsequent updates to the maximum priority for requests working on the disks.

25. An storage controller comprising:
   means for associating priorities with respective disk access requests for a disk array, wherein the disk array has a number of disks;
   means for sending the disk access requests for working by the disks;
   means for determining a maximum priority for certain disk access requests received;
   means for comparing the priority of a new disk access request to the priority for the certain requests;
   means for selecting between i) categorizing the new disk access request as a foreground disk access and ii) categorizing the new disk access request as a background disk access, responsive to the comparison; and
   means for selecting between i) working the new disk access request on at least one of the disks and ii) placing the new disk access request in a queue external to the disks, responsive to the comparison, wherein such categorization of a new disk access request categorizes the new disk access request exclusively as a foreground disk access or exclusively as a background disk access so that such a disk access request is not categorized as both a foreground disk access and a background disk access.

26. The storage controller of claim 25, wherein the requests working on the disks include foreground and background requests, and the storage controller is operable to associate measures of disk work with respective requests, and wherein the means for selecting between i) working the new request on at least one of the disks and ii) placing the new request in a queue is responsive to whether the current foreground disk work exceeds a first predetermined limit, if the request is categorized as a foreground request.

27. The storage controller of claim 25, wherein the requests working on the disks include foreground and background requests, and the storage controller is operable to associate measures of disk work with respective requests, and wherein the means for selecting between i) working the new request on at least one of the disks and ii) placing the new request in a queue is responsive to whether the current background disk work plus the disk work for the new request exceeds a predetermined limit, if the request is categorized as a background request.

28. The storage controller of claim 27, wherein the means for selecting between i) working the new request on at least one of the disks and ii) placing the new request in a queue is responsive to whether there is current background disk work, if the request is categorized as a background request.

29. The storage controller of claim 25, wherein the means for selecting between i) working the new request on at least one of the disks and ii) placing the new request in a queue is responsive to current disk work, and the storage controller comprises:
   means for releasing a request from its queue responsive to the disk work falling below a predetermined limit.

30. The storage controller of claim 25, wherein foreground requests placed in a queue are placed in a first queue and background requests placed in a queue are placed in a second queue.

31. The storage controller of claim 25, wherein the certain requests received, for which the maximum priority is determined, include requests received during a certain time interval.

32. The storage controller of claim 25, wherein the categorizing for a request occurs only once regardless of subsequent updates to the maximum priority for requests working on the disks.

33. A method for managing requests in a disk array having a number of disks, the method comprising:
   associating priorities with respective requests;
   working the requests by the disks:
   determining a maximum priority for certain requests received;
   comparing the priority of a new request to the priority for the certain requests;
   selecting between i) categorizing the new request as a foreground disk operation and ii) categorizing the new request as a background disk operation, responsive to the comparison; and
   selecting between i) working the new request on at least one of the disks and ii) placing the new request in a queue, responsive to the comparison, wherein the requests working on the disks include foreground and background requests, the method comprising associating measures of disk work with respective requests, wherein the selecting between i) working the new request on at least one of the disks and ii) placing the new request in a queue is responsive to whether current background disk work plus disk work for the new request exceeds a predetermined limit, if the request is categorized as a background request.

34. The method of claim 33, wherein the selecting between i) working the new request on at least one of the disks and ii) placing the new request in a queue is responsive to whether there is current background disk work, if the request is categorized as a background request.

35. A computer program product for use in managing requests in a disk array having a number of disks, the computer program product comprising computer readable storage media including program logic embedded therein that causes control circuitry to perform:

associating priorities with respective requests;

working the requests by the disks;

determining a maximum priority for certain requests received;

comparing the priority of a new request to the priority for the certain requests;

selecting between i) categorizing the new request as a foreground disk operation, and ii) categorizing the new request as a background disk operation, responsive to the comparison; and selecting between i) working the new request on at least one of the disks and ii) placing the new request in a queue, responsive to the comparison, wherein the requests working on the disks include foreground and background requests and wherein the program logic causes control circuitry to perform:

associating measures of disk work with respective requests, wherein the selecting between i) working the new request on at least one of the disks and ii) placing the new request in a queue is responsive to whether the current background disk work plus the disk work for the new request exceeds a predetermined limit, if the request is categorized as a background request.

36. The computer program product of claim 35, wherein the selecting between i) working the new request on at least one of the disks and ii) placing the new request in a queue is responsive to whether there is current background disk work, if the request is categorized as a background request.

37. An apparatus comprising:

a processor;

a disk array having a number of disks and at least one queue, the at least one queue being external to the disks; and a memory having instructions operable with the processor for managing requests in the disk array to perform:

associating priorities with respective requests;

working the requests by the disks;

determining a maximum priority for certain requests received;

comparing the priority of a new request to the priority for the certain requests;

selecting between i) categorizing the new request as a foreground disk operation and ii) categorizing the new request as a background disk operation, responsive to the comparison; and selecting between i) working the new request on at least one of the disks and ii) placing the new request in a queue, responsive to the comparison, wherein the requests working on the disks include foreground and background requests, and the processor is operable with the instructions to associate measures of disk work with respective requests, and wherein the selecting between i) working the new request on at least one of the disks and ii) placing the new request in a queue is responsive to whether the current background disk work plus the disk work for the new request exceeds a predetermined limit, if the request is categorized as a background request.

38. The apparatus of claim 37, wherein the selecting between i) working the new request on at least one of the disks and ii) placing the new request in a queue is responsive to whether there is current background disk work, if the request is categorized as a background request.

39. A storage controller comprising:

means for associating priorities with respective requests for a disk array, wherein the disk array has a number of disks;

means for sending the requests for working by the disks;

means for determining a maximum priority for certain requests received;

means for comparing the priority of a new request to the priority for the certain requests;

means for selecting between i) categorizing the new request as a foreground disk operation and ii) categorizing the new request as a background disk operation, responsive to the comparison; and means for selecting between i) working the new request on at least one of the disks and ii) placing the new request in a queue external to the disks, responsive to the comparison, wherein the requests working on the disks include foreground and background requests, and the storage controller is operable to associate measures of disk work with respective requests, and wherein the means for selecting between i) working the new request on at least one of the disks and ii) placing the new request in a queue is responsive to whether the current background disk work plus the disk work for the new request exceeds a predetermined limit, if the request is categorized as a background request.

40. The storage controller of claim 39, wherein the means for selecting between i) working the new request on at least one of the disks and ii) placing the new request in a queue is responsive to whether there is current background disk work, if the request is categorized as a background request.

* * * * *